(12) United States Patent
Tokuda et al.

(10) Patent No.: US 7,482,175 B2
(45) Date of Patent: Jan. 27, 2009

(54) METHOD OF MANUFACTURING SUBSTRATE HAVING PERIODICALLY POLED REGIONS

(75) Inventors: Katuhiko Tokuda, Atsugi (JP); Kazutomo Kadokura, Atsugi (JP)

(73) Assignee: Shimadzu Corporation, Kyoto-shi (JP)

( * ) Notice: Subject to any disclaimer, the term of this patent is extended or adjusted under 35 U.S.C. 154(b) by 382 days.

(21) Appl. No.: 11/312,308

(22) Filed: Dec. 20, 2005

(65) Prior Publication Data

US 2006/0292706 A1  Dec. 28, 2006

(30) Foreign Application Priority Data

Jun. 24, 2005  (JP) .............................. 2005-184828

(51) Int. Cl.
*H01L 21/00* (2006.01)
(52) U.S. Cl. ................................... 438/3; 257/E21.208
(58) Field of Classification Search ...................... 438/3, 438/11; 257/E21.208
See application file for complete search history.

(56) References Cited

U.S. PATENT DOCUMENTS

| 5,380,410 | A | * | 1/1995 | Sawaki et al. | 361/225 |
| 5,652,674 | A | * | 7/1997 | Mizuuchi et al. | 359/326 |
| 6,580,632 | B2 | * | 6/2003 | Shimada et al. | 365/145 |

FOREIGN PATENT DOCUMENTS

JP           3059080          4/2000

\* cited by examiner

*Primary Examiner*—Chandra Chaudhari
(74) *Attorney, Agent, or Firm*—Rankin, Hill & Clark LLP

(57) ABSTRACT

A current is observed while applying a gradually increasing voltage between electrodes formed front and rear surfaces of a substrate, and then poled regions are formed by applying a DC voltage, which has a voltage value at that time or another voltage value obtained by adding a predetermined value to the voltage value (i.e., an inverted voltage value or a voltage value obtained by adding a predetermined voltage to the inverted voltage value), for a predetermined time when an inverted current is observed.

10 Claims, 6 Drawing Sheets

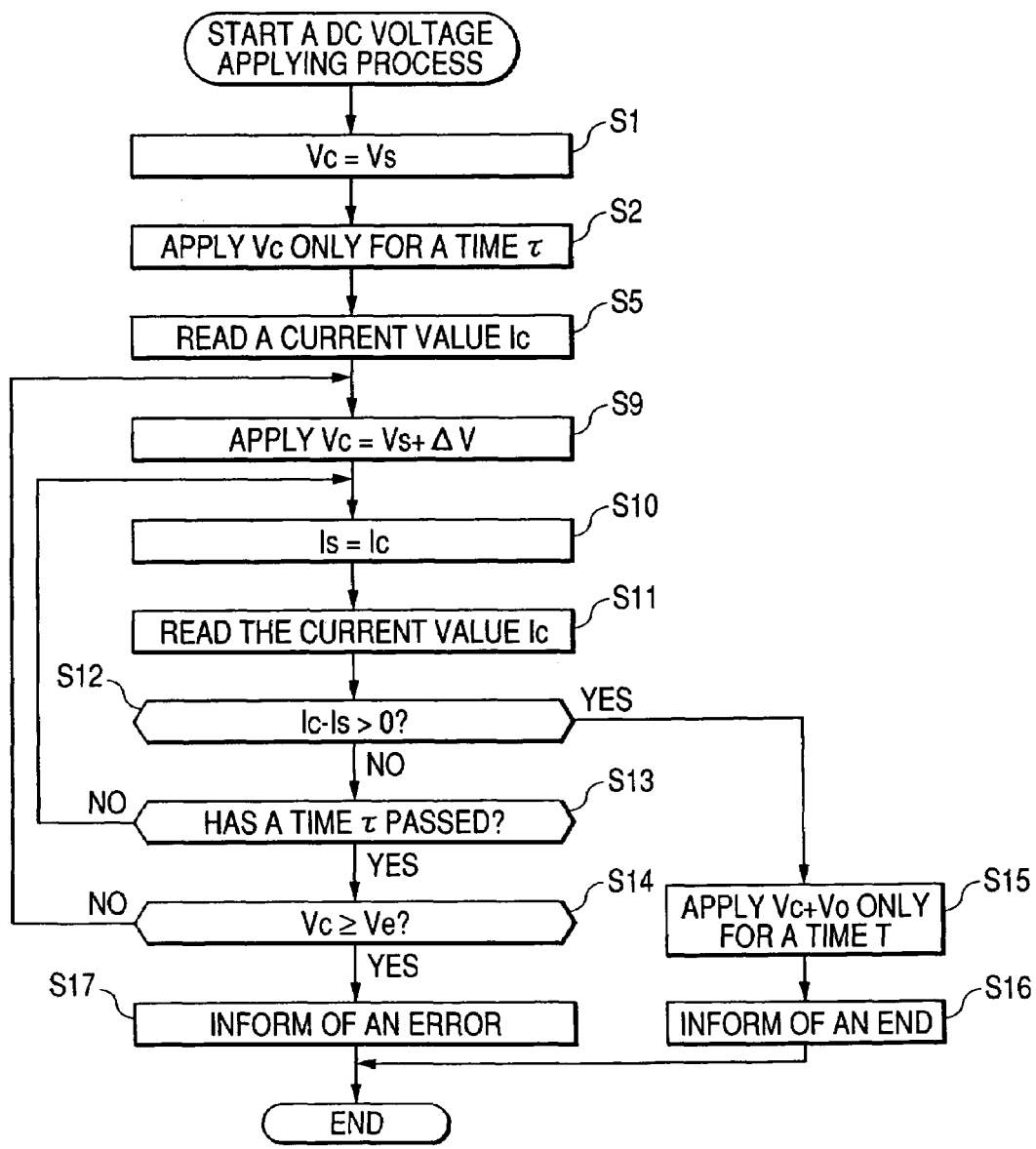

METHOD OF MANUFACTURING SUBSTRATE HAVING PERIODICALLY POLED REGIONS

The present application claims foreign priority under 35 USC 119 based on Japanese Patent Application No. 2005-184828, filed Jun. 24, 2005, the content of which is incorporated herein by reference.

BACKGROUND OF THE INVENTION

1. Technical Field

The present invention relates to a method of manufacturing a substrate having periodically poled regions and, more particularly, a method of manufacturing a substrate having periodically poled regions, capable of suppressing a variation of a periodic structure caused due to the substrate and also attaining stable characteristics particularly even when a stoichiometric lithium tantalite substrate is used.

2. Related Art

A periodic electrode is formed on a surface of a lithium niobate substrate (CLN substrate) or a lithium tantalate substrate (CLT substrate) with a congruent (congruent melting) constitution and also a plane electrode is formed on a rear surface thereof, and then periodically poled regions are formed by applying the DC voltage in excess of the inverted voltage value (the voltage value at which the inverted current starts to flow) between these electrodes (see Japanese Patent No. 3059080 ([0040] to [0047])).

As mentioned above, the periodically poled regions are formed on the substrate by applying the DC voltage in excess of the inverted voltage value between these electrodes.

However, in the periodic structure of the periodically poled regions formed in this manner, there existed the problem such that a variation of the periodic structure is caused due to the substrate. In particular, in the recently developed stoichiometric lithium tantalite substrate, there existed the problem such that a variation of the periodic structure becomes large and thus stable characteristic cannot be obtained.

SUMMARY OF THE INVENTION

The invention may provide a method of manufacturing a substrate having periodically poled regions, capable of suppressing a variation of a periodic structure caused due to the substrate and also attaining stable characteristics particularly even when a stoichiometric lithium tantalite substrate is used.

One or more embodiments of the invention provide a method of manufacturing a substrate having periodically poled regions, comprising:

observing a current while applying a gradually increasing voltage between electrodes of a singly polarized ferroelectric substrate, to front and rear surfaces of which the electrodes at least one of which is a periodic electrode are provided; and applying a DC voltage, which has a voltage value at that time when an inverted current is observed or another voltage value obtained by adding a predetermined value to the voltage value, continuously after observing the inverted current.

As the result of the zealous study made by the inventors of the present invention, it was found that the inverted voltage value has a variation every substrate and this variation causes a variation of the periodic structure. In other words, when the inverted voltage value of nine sheets of MgO-doped stoichiometric lithium tantalite substrates, which were cut out from the same ingot to have the same shape, was measured actually, one sheet had the inverted voltage value of 300 V, five sheets had the inverted voltage value of 350 V, and three sheets had the inverted voltage value of 400 V. However, since the DC voltage is not normalized every substrate in the related art, the DC voltage is set to 400 V, for example, in nine sheets of substrates. Then, the DC voltage that is higher than the inverted voltage value by 100 V is applied to the substrate whose inverted voltage value is 300 V, the DC voltage that is higher than the inverted voltage value by 50 V is applied to the substrate whose inverted voltage value is 350 V, and the DC voltage that is equal to the inverted voltage value of the substrate is applied to the substrate whose inverted voltage value is 400 V. Since the polarization structure having the higher duty ratio can be formed when the applied DC voltage is increased higher than the inverted voltage value of the substrate, consequently the polarization structure formed on nine sheets of substrates is varied into three types respectively. In particular, in the stoichiometric lithium tantalite substrate, since an inverted electric field value (=inverted voltage value/substrate thickness) is very low such as 2 kV/mm, the formed polarization structure has a large variation even when a difference between the inverted voltage value and the DC voltage is shifted merely by several tens V.

Therefore, in the method of manufacturing a substrate having periodically poled regions according to the present invention, the current is observed while applying a gradually increasing voltage between electrodes, and then the DC voltage having the voltage value at that time or another voltage value obtained by adding a predetermined value to the voltage value, i.e., the inverted voltage value or the voltage value obtained by adding a predetermined value to the inverted voltage value, is applied when the inverted current is observed. Accordingly, since the applied DC voltage can be set to the inverted voltage value of the substrate or the voltage value that is higher than the inverted voltage value by a predetermined value even when the inverted voltage value of the substrate is varied, the polarization structures having the same duty ratio can be formed and thus a variation of the periodic structure caused due to the substrate can be suppressed.

One or more embodiments of the invention provide the method of manufacturing a substrate having periodically poled regions, in which the ferroelectric substrate is made of a lithium tantalite single crystal that has a stoichiometric composition (stoichiometry) of an C-plate or near to the stoichiometric composition.

In the method of manufacturing the substrate having periodically poled regions according to the present invention, the applied DC voltage can be set to the inverted voltage value of the substrate or the voltage value that is higher than this inverted voltage value by a predetermined value even when the inverted voltage value of the substrate is varied. Therefore, the polarization structure can be formed without variation even on the stoichiometric lithium tantalite substrate the inverted voltage value of which is very low.

Here, as the result of the earnest study made by the inventors of the present invention, it was found that the velocity at which the poled region spreads laterally is slower by far than the velocity estimated in the related art, and thus the substrate on which the periodically poled regions can be formed by applying the DC electric field only can be manufactured preferably by the method of the present invention.

One or more embodiments of the invention provide the method of manufacturing a substrate having periodically poled regions, in which a mole ratio of $Li_2O/(Ta_2O_5+Li_2O)$ of the ferroelectric substrate is equal to or larger than 0.495 but smaller than 0.505.

In the method of manufacturing the substrate having periodically poled regions according to the present invention, as shown in the embodiment described later, the periodically poled regions can be formed preferably.

One or more embodiments of the invention provide the method of manufacturing a substrate having periodically poled regions, in which a mole ratio of $Li_2O/(Ta_2O_5+Li_2O)$ of the ferroelectric substrate is equal to or larger than 0.495 but smaller than 0.505 and at least one of Mg, Zn, Sc, and In is doped in the substrate.

In the method of manufacturing the substrate having periodically poled regions according to the present invention, at least one of Mg and Zn, Sc, and In, each being equivalent to Mg, is doped. Therefore, the inverted voltage value can be reduced.

According to a method of manufacturing a substrate having periodically poled regions of the present invention, a variation of a periodic structure caused due to the substrate can be suppressed, and particularly stable characteristics can also be attained even when a stoichiometric lithium tantalite substrate is used.

BRIEF DESCRIPTION OF THE DRAWINGS

FIG. 9 shows a flowchart showing procedures of applying the DC voltage to the substrate (Embodiment 3).

DETAILED DESCRIPTION OF THE INVENTION

The present invention will be explained in more detail with reference to an illustrated embodiment hereinafter. In this case, the present invention is not limited to this embodiment.

Embodiment 1

Figure 1:
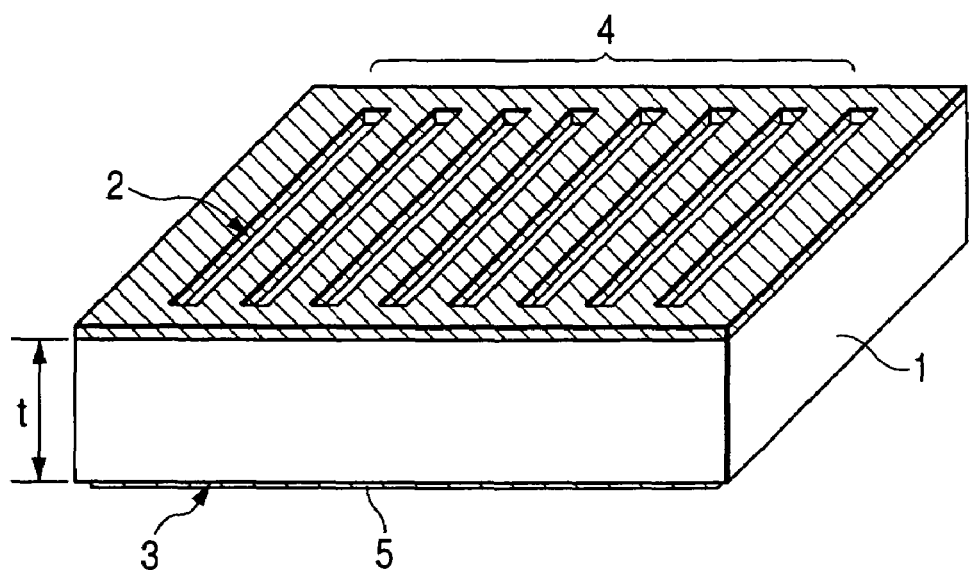
FIG. 1 shows a perspective view showing a substrate on both surfaces of which a periodic electrode and a solid electrode are formed respectively.

FIG. 1 is a perspective view showing a situation that a periodic electrode 4 and a solid electrode 5 are formed on both surfaces of a substrate 1 respectively. The substrate 1 is made of a single crystal of the lithium tantalite having a stoichiometric composition of a singly polarized C plate or near to the stoichiometric composition which has a molar ratio of $Li_2O/(Ta_2O_5+Li_2O)$ equal to or larger than 0.495 and smaller than 0.505 and is doped with MgO. A thickness of the substrate 1 is set to t=0.4 [mm].

The periodic electrode 4 and the solid electrode 5 are formed as follows.

(1) An electrode metal such as Ta, or the like, for example, is formed on a +C face 2 and a −C face 3 of the substrate 1.

Figure 2:
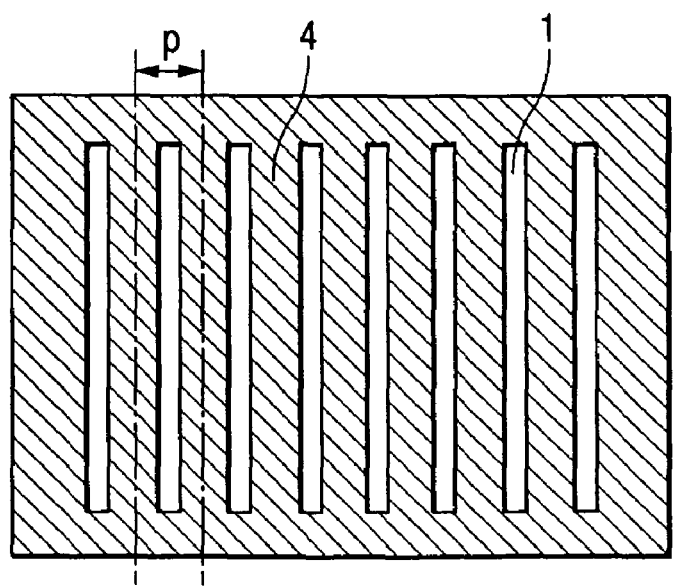
FIG. 2 shows a top view showing the periodic electrode.

(2) As shown in FIG. 2, the photolitho machining and the etching are applied to the electrode metal formed on the +C face. Thus, the periodic electrode 4 having a period p=5.5 [μm], for example, is formed.

Figure 3:
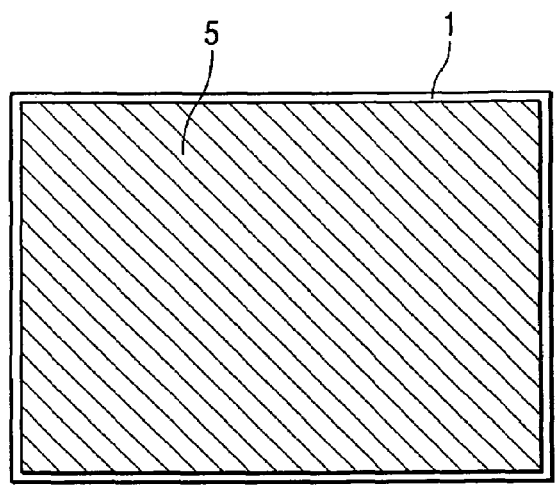
FIG. 3 shows a bottom view showing the solid electrode.

(3) As shown in FIG. 3, the photolitho machining and the etching are applied to the electrode metal formed on the −C face. Thus, the solid electrode 5 having a necessary area is formed.

Figure 4:
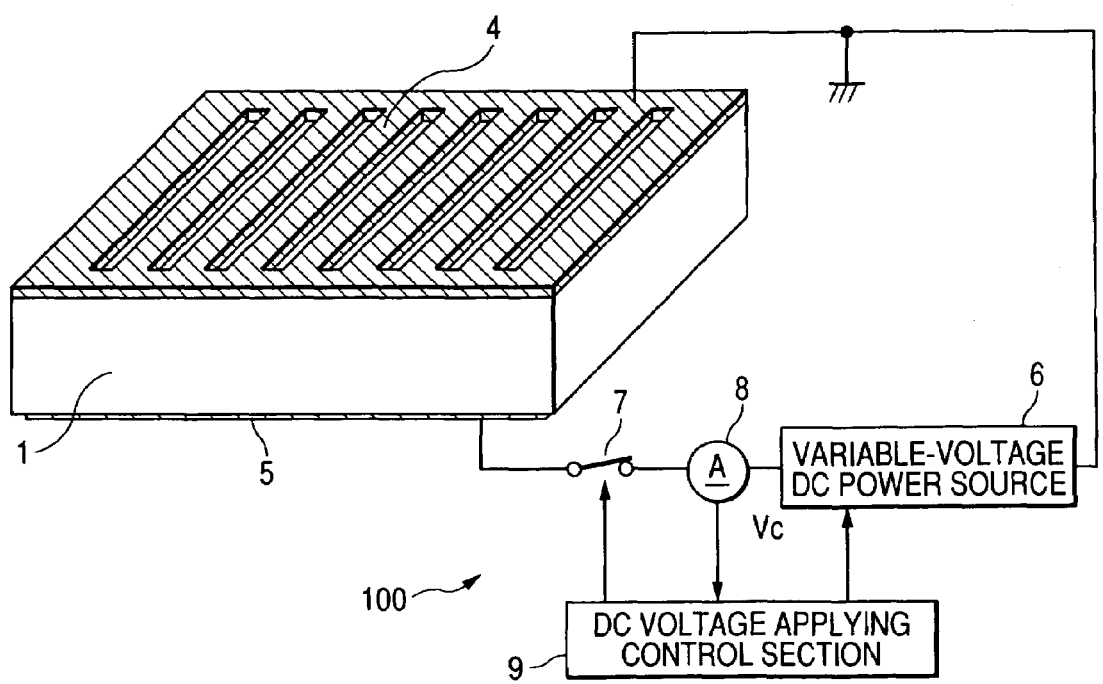
FIG. 4 shows an explanatory view showing a circuit that applies a DC voltage to the substrate.

FIG. 4 is an explanatory view showing a DC voltage application circuit 100 used to apply a DC voltage between the electrodes 4, 5 of the substrate 1.

This DC voltage application circuit 100 comprises a variable-voltage DC power source 6, a switching circuit 7, an ampere meter 8, and a DC-voltage application controlling portion 9.

In this case, the substrate 1 is dipped into an insulating oil.

Figure 5:
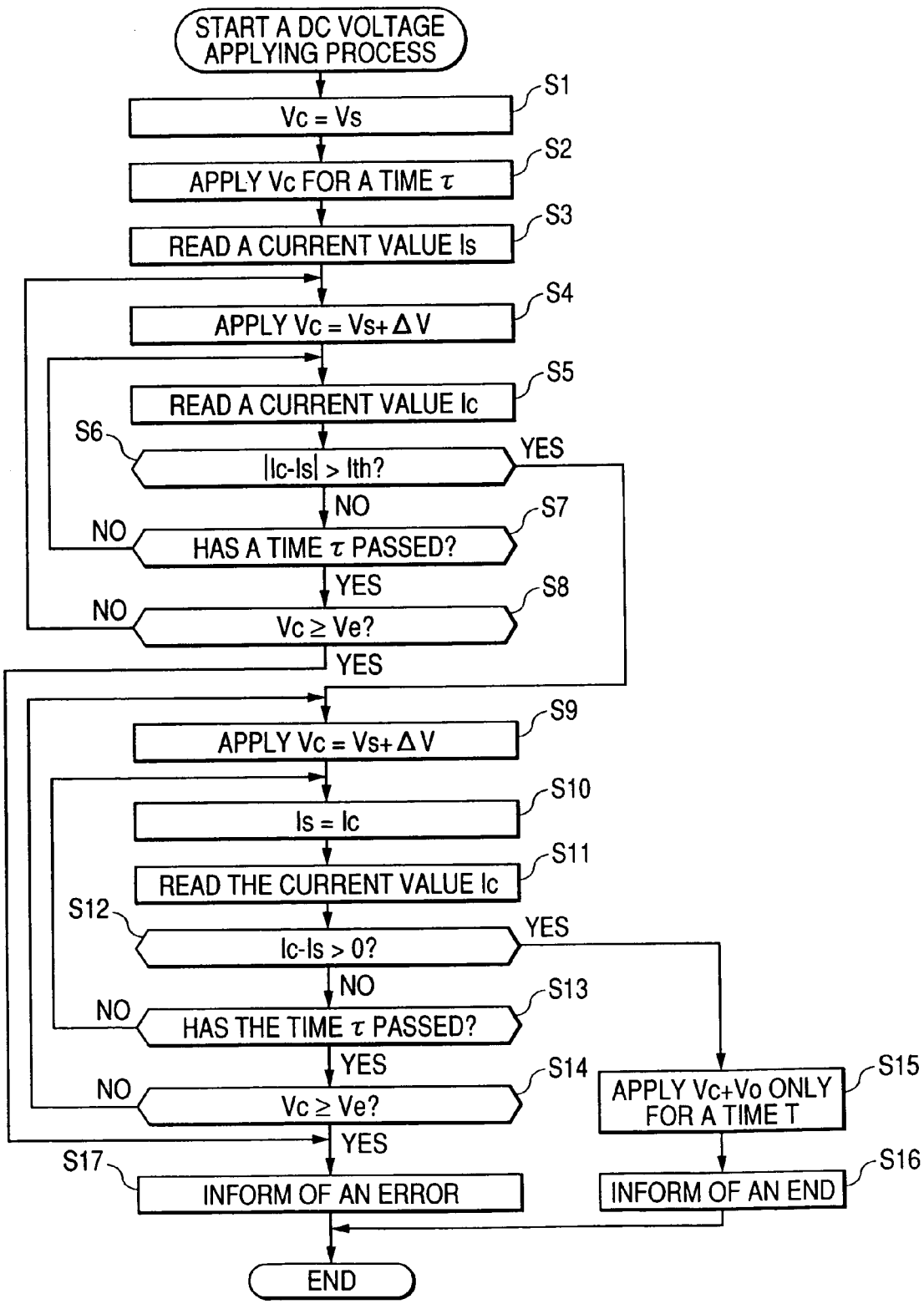
FIG. 5 shows a flowchart showing procedures of applying the DC voltage to the substrate (Embodiment 1).

FIG. 5 is a flowchart showing procedures of a DC voltage applying process executed by the DC voltage application circuit 100.

In step S1, a DC voltage Vc that the variable-voltage DC power source 6 outputs is set to a start voltage Vs (−200 V, for example).

In step S2, the switching circuit 7 is turned on to apply the DC voltage Vc to the periodic electrode 4 and the solid electrode 5. After the DC voltage is applied for a time τ (2.5 second, for example), the process goes to step S3.

In step S3, a current value Is is read from the ampere meter 8.

In step S4, the output voltage Vc of the variable-voltage DC power source 6 is changed by ΔV (−10 V, for example). Then, this DC voltage Vc is applied to the periodic electrode 4 and the solid electrode 5.

In step S5, a current value Ic is read from the ampere meter 8.

In step S6, if |Ic-Is|>Ith (4 μA, for example) is not satisfied, the process goes to step S7. In contrast, if |Ic-Is|>Ith is satisfied, the process goes to step S9. In other words, the process goes to step S7 until the current Ic in FIG. 6(b) is changed from the start current value Is by a threshold value Ith, while the process goes to step S9 after the current Ic is changed from the start current value Is by the threshold value Ith.

In step S7, the processes in steps S5, S6 are repeated until a time τ has passed from step S4, while the process goes to step S8 after a time τ has passed.

In step S8, if the output voltage Vc of the variable-voltage DC power source 6 does not exceed an end voltage Ve (−800 V, for example), the process goes back to step S4. In contrast, if the output voltage Vc exceeds the end voltage Ve, the process goes to step S17.

In step S9, the output voltage Vc of the variable-voltage DC power source 6 is changed by ΔV (−10 V, for example). Then, the DC voltage Vc is applied to the periodic electrode 4 and the solid electrode 5.

In step S10, the latest current value Ic is saved as a preceding current value Is.

In step S11, the current value Ic is read from the ampere meter 8.

In step S12, if Ic-Is>0 is not satisfied, the process goes to step S13. In contrast, if Ic-Is>0 is satisfied, the process goes to step S15. In other words, the process goes to step S13 until a negative peak of the current value Ic in FIG. 6(b) is sensed, while the process goes to step S15 after the negative peak of the current value Ic is sensed.

In step S13, the processes in steps S10 to S12 are repeated until a time τ has passed from step S9, while the process goes to step S14 after a time τ has passed.

In step S14, if the output voltage Vc of the variable-voltage DC power source 6 is not in excess of the end voltage Ve (−800 V, for example), the process goes back to step S9. In contrast, if the output voltage Vc is in excess of the end voltage Ve, the process goes to step S17.

In step S15, the output voltage Vc of the variable-voltage DC power source 6 is changed by Vo (−50 V, for example). The DC voltage Vc is applied to the periodic electrode 4 and the solid electrode 5 only for a time T (20 second, for example). Then, the process goes to step S16.

In step S16, an end of the process is informed. Then, the process is ended.

In step S17, an error is informed. Then, the process is ended.

Figure 6A:
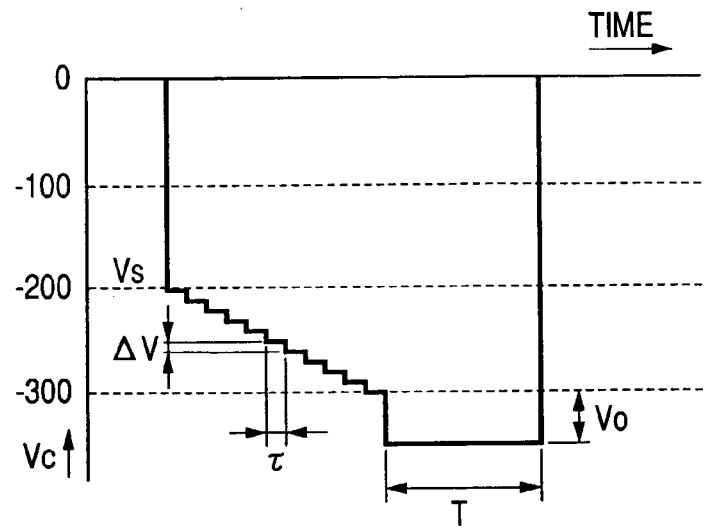
FIGS. 6(a)(b) show views illustrating a change of the applied DC voltage and a change of a current value respectively.
Figure 6B:
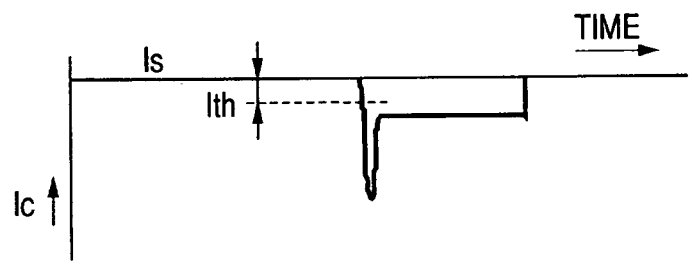

A change of the DC voltage Vc is illustrated in FIG. 6(a), and a change of the current value Ic illustrated in FIG. 6(b).

Figure 7:
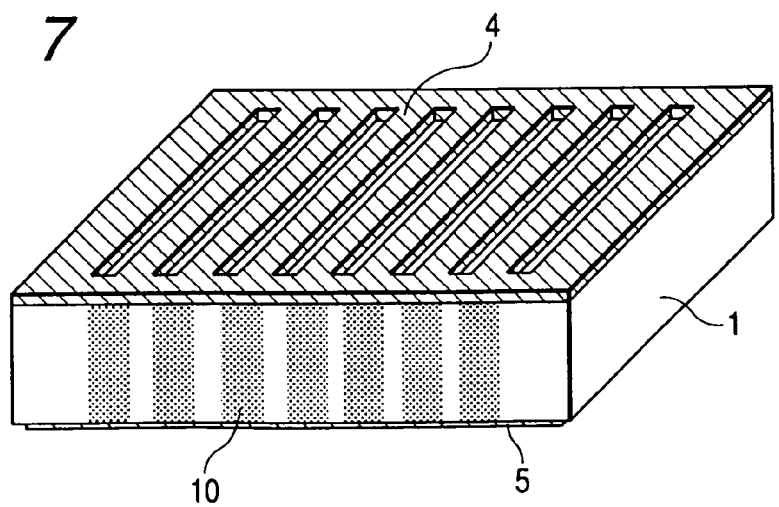
FIG. 7 shows a perspective view showing a substrate having a poled structure.

The substrate 1 on which periodically poled regions 10 are formed is shown in FIG. 7.

In FIG. 6, the DC voltage Vc is changed stepwise. But the DC voltage Vc may be changed like a slope by shortening a time τ (1 second, for example) and reducing a voltage increment ΔV (−4 V, for example).

Also, Vo=0 V may be set.

Also, at least one of Zn, Sc, and In may be doped in the substrate instead of MgO. Alternately, an undoped substrate may be employed.

According to Embodiment 1, since the DC voltage Vc is optimized every substrate 1, the applied DC voltage Vc can be set to the inverted voltage value of the substrate 1 or the voltage value that is higher than the inverted voltage value by a predetermined value even when the inverted voltage of the substrate 1 is varied, so that the polarization structures having the same duty ratio can be formed. As a result, a variation of the periodic structure caused due to the substrate 1 can be suppressed and the stable characteristics can also be attained even when the stoichiometric lithium tantalite substrate is used.

Embodiment 2

Figure 8:
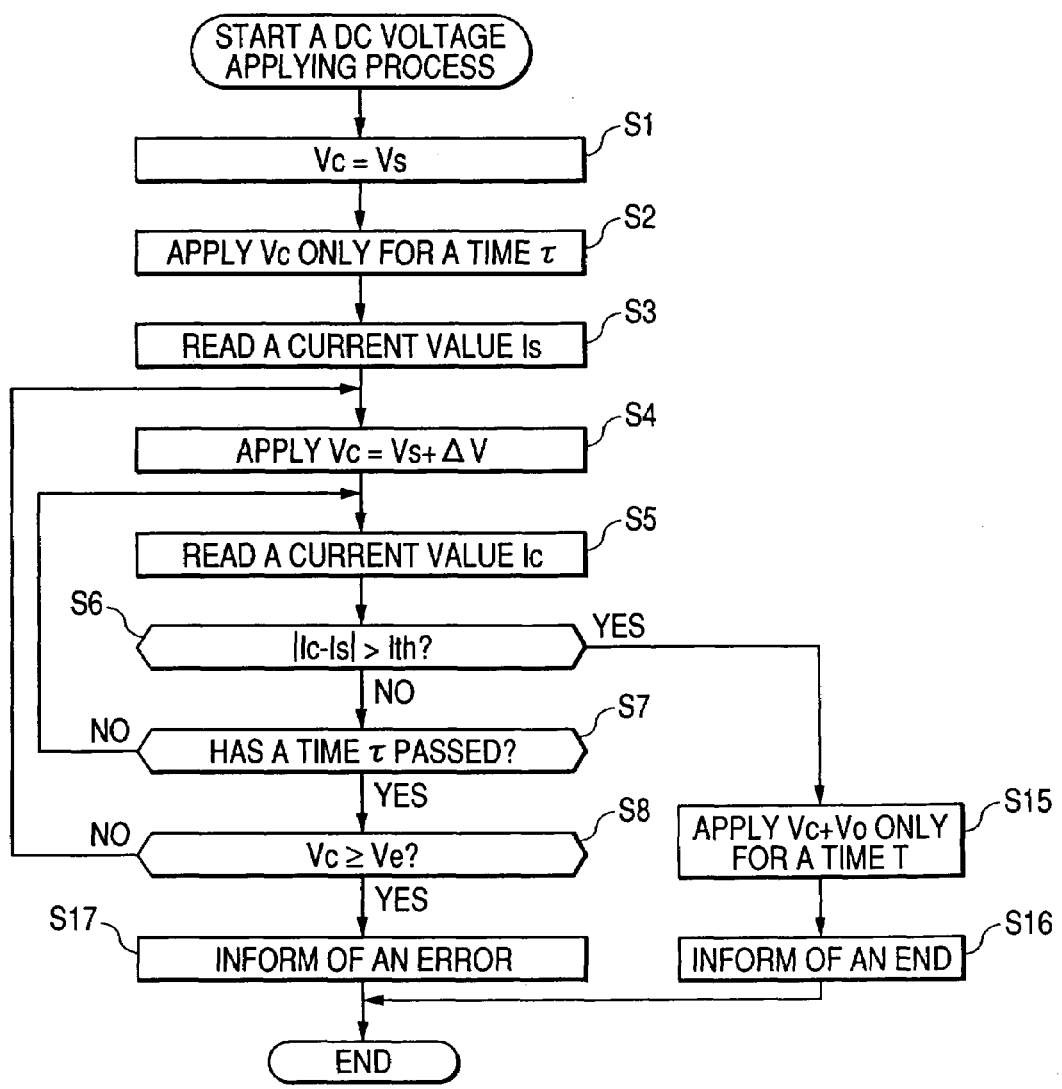
FIG. 8 shows a flowchart showing procedures of applying the DC voltage to the substrate (Embodiment 2).

FIG. 8 is a flowchart showing procedures of the DC voltage applying process executed by the DC voltage application circuit 100 according to Embodiment 2.

These procedures correspond to simplified procedures in Embodiment 1, and the contents in respective steps are similar to the contents of steps to which the same reference numerals as those in steps in FIG. 5 are affixed.

That is, in Embodiment 2, the DC voltage Vc+Vo in the final stage is applied at a time point when the current value Ic in FIG. 6(b) is changed from the start current value Is by the threshold value Ith.

Embodiment 3

FIG. 9 is a flowchart showing procedures of the DC voltage applying process executed by the DC voltage application circuit 100 according to Embodiment 3.

These procedures correspond to simplified procedures in Embodiment 1, and the contents in respective steps are similar to the contents of steps to which the same reference numerals as those in steps in FIG. 5 are affixed.

That is, in Embodiment 3, the DC voltage Vc+Vo in the final stage is applied at a time point when the negative peak of the current value Ic in FIG. 6(b) is sensed.

The substrate having the periodically poled structure manufactured by the present invention can be utilized as the optical function element in the semiconductor-pumped solid state laser using the SHG (Second Harmonic Wave Generation) wavelength conversion technology, for example, or the like. Also, this substrate can be utilized in the optical communication field such as WDM (Wavelength Division Multiplexing) communication by executing the wavelength shift over a wide range as the QPM (Quasi Phase Matching) device, and the like.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

We claim:

1. A method of manufacturing a substrate having periodically poled regions, comprising:
    providing a solely polarized ferroelectric substrate having opposite surfaces provided with electrodes at least one of which is a periodic electrode;
    applying a DC voltage between the electrodes;
    increasing the DC voltage gradually while observing an inversion current flowing in the substrate; and
    maintaining a value of the DC voltage, which is obtained by adding a predetermined value to a value of the DC voltage of when a value of the inversion current is once increased and then decreased.

2. The method according to claim 1, wherein the ferroelectric substrate is made of a lithium tantalite single crystal having a stoichiometric composition of or near to a C plate.

3. The method according to claim 2, wherein the ferroelectric substrate has a mole ratio of $Li_2O/(Ta_2O_5+Li_2O)$ that is equal to or larger than 0.495, but smaller than 0.505.

4. The method according to claim 2 wherein the ferroelectric substrate is doped with at least one of Mg, Zn, Sc, and In.

5. The method according to claim 1, wherein the predetermined value is zero.

6. A method of manufacturing a substrate having periodically poled regions, comprising:
    providing a solely polarized ferroelectric substrate having opposite surfaces provided with electrodes at least one of which is a periodic electrode;
    applying a DC voltage between the electrodes;
    increasing the DC voltage gradually while observing an inversion current flowing in the substrate; and
    maintaining a value of the DC voltage, which is obtained by adding a predetermined value to a value of the DC voltage of when a value of the inversion current exceeds a predetermined threshold value after the inversion current starts to flow.

7. The method according to claim 6, wherein the ferroelectric substrate is made of a lithium tantalite single crystal having a stoichiometric composition of or near to a C plate.

8. The method according to claim 7, wherein the ferroelectric substrate has a mole ratio of $Li_2O/(Ta_2O_5+Li_2O)$ that is equal to or larger than 0.495, but smaller than 0.505.

9. The method according to claim 7, wherein the ferroelectric substrate is doped with at least one of Mg, Zn, Sc and In.

10. The method according to claim 6, wherein the predetermined value is zero.

* * * * *